(12) United States Patent
Wang

(10) Patent No.: US 12,122,592 B2
(45) Date of Patent: Oct. 22, 2024

(54) 45-FOOT AND 53-FOOT CONTAINER FLOOR AND CONTAINER

(71) Applicant: Longjin Wang, Dexing (CN)

(72) Inventor: Longjin Wang, Dexing (CN)

(73) Assignee: Longjin Wang, Dexing (CN)

( * ) Notice: Subject to any disclaimer, the term of this patent is extended or adjusted under 35 U.S.C. 154(b) by 424 days.

(21) Appl. No.: 17/485,508

(22) Filed: Sep. 27, 2021

(65) Prior Publication Data

US 2023/0058985 A1     Feb. 23, 2023

(51) Int. Cl.
*B65D 88/12*     (2006.01)
*B65D 90/02*     (2019.01)

(52) U.S. Cl.
CPC ........... *B65D 90/022* (2013.01); *B65D 88/12* (2013.01); *B65D 90/027* (2013.01)

(58) Field of Classification Search
CPC .............................. B65D 88/12; B65D 90/027
See application file for complete search history.

(56) References Cited

U.S. PATENT DOCUMENTS

| | | | | |
|---|---|---|---|---|
| 2009/0181209 A1* | 7/2009 | Zheng | ................... | B32B 21/14 428/537.1 |
| 2016/0288993 A1* | 10/2016 | Hu | ..................... | B65D 90/08 |
| 2022/0411177 A1* | 12/2022 | Burton | ................ | B27D 1/08 |

FOREIGN PATENT DOCUMENTS

| | | | |
|---|---|---|---|
| CN | 207359760 | * | 5/2018 |
| CN | 207580549 U | | 7/2018 |
| CN | 108438574 A | | 8/2018 |
| CN | 209291174 U | | 8/2019 |
| CN | 209506675 | * | 10/2019 |
| CN | 110978159 | * | 4/2020 |
| WO | WO8807485 | * | 10/1988 |

OTHER PUBLICATIONS

English translation of CN209506675 (Year: 2019).*
English translation of CN207359760 (Year: 2018).*
English translation of CN110978159 (Year: 2020).*

* cited by examiner

*Primary Examiner* — Don M Anderson
(74) *Attorney, Agent, or Firm* — Nitin Kaushik

(57) ABSTRACT

A 45-foot and 53-foot container floor and a container are provided by the present disclosure, and relate to the container technology field. A container floor comprises a floor body, and the floor body comprises a first bamboo mat layer, an interlayer and a second bamboo mat layer, and the first bamboo mat layer, the interlayer and the second bamboo mat layer are sequentially pasted from a top to a bottom; a protection assembly is arranged on the floor body, the protection assembly comprises a protection shell and fastening screws, the protection shell is circumferentially wrapped on a side wall of the floor body, and the fastening screws are arranged running through the protection shell and the floor body. A container of the present disclosure comprises a container floor, and a plurality of Ω-shaped mounting parts are arranged on the container.

7 Claims, 4 Drawing Sheets

45-FOOT AND 53-FOOT CONTAINER FLOOR AND CONTAINER

CROSS-REFERENCE TO RELATED APPLICATIONS

The application claims priority to Chinese patent application No. 202110932523X, filed on Aug. 18, 2021, the entire contents of which are incorporated herein by reference.

TECHNICAL FIELD

The present disclosure relates to the field of container technology, in particular to a 45-foot and 53-foot container floor and a container.

BACKGROUND

In the existing container structure, the container floor structure is the main bearing component, so high strength of the container underframe and the floor laid on the container underframe are required. The existing container floor has the following defects. 1. Environmental protection performance: the current container floor is mainly made of wood, and has a long-term dependence on the wood grown in Southeast Asia and other tropical rainforests. Due to the long growth cycle and excessive logging of these tree species, a large area of the tropical rainforests around the world have disappeared. The resources are increasingly scarce, resulted in increasingly the environmental protection pressure. The material substitution is the theme that the industry has been exploring and overcoming. 2. Lightweight: the density of the traditional wooden container floor unit is about 800 KG/m$^3$, which leads to the increase of the overall weight of the container, and energy is wasted in both vehicle transportation and marine transportation, and lightweighting the container floor unit becomes the development trend. 3. Installation features: at least 12 floors are needed in a 40-foot standard container for traditional wooden container floor unit. The installation process is to lay the floor unit onto the underframe in the container with labor or equipment, insert on all sides for positioning (manually), draw the positioning lines, drill the holes, scatter the screws, lock the screws and other processes, with high labor intensity and low efficiency.

The existing container floor is made of plywood which are glued together by multi-layers, and the side wall of the existing container floor is easy to be damaged and broken, and the use effect is not good.

SUMMARY

The present disclosure aims to provide a 45-foot and 53-foot container floor and the 45-foot and 53-foot container floor can effectively protect the floor of the container and improve the service life of the container.

Another object of the present disclosure is to provide a 45-foot and 53-foot container, and the 45-foot and 53-foot container can facilitate the installation of a container floor and improve the installation efficiency of the container floor.

Embodiments of the present disclosure are realized as follows:

in the first aspect, a 45-foot and 53-foot container floor is provided by the embodiment of the present disclosure, comprising: a floor body, the floor body comprises a first bamboo mat layer, an interlayer and a second bamboo mat layer, and the first bamboo mat layer, the interlayer and the second bamboo mat layer are sequentially pasted from a top to a bottom; a protection assembly is arranged on the floor body, the protection assembly comprises a protection shell and fastening screws, the protection shell is circumferentially wrapped on a side wall of the floor body, and the fastening screws are arranged running through the protection shell and the floor body.

In some embodiments of the present disclosure, a plurality of U-shaped grooves are formed on a side of the floor body close to a container, firmwares are correspondingly arranged on the plurality of the U-shaped grooves. A sealing layer is arranged between the firmwares and the floor body, and the firmwares are inserted into the interlayer through the fastening screws.

In some embodiments of the present disclosure, the protection shell is provided with a mounting groove.

In some embodiments of the present disclosure, the floor body is coated with an isolation layer.

In some embodiments of the present disclosure, a material of the isolation layer contains a phenolic resin adhesive with an insect repellent.

In some embodiments of the present disclosure, the interlayer is laminated with multi-layer bamboo curtains, the bamboo curtains are laminated with a plurality of bamboo strips, and the bamboo strips of adjacent bamboo curtains are arranged perpendicularly to an each other.

In some embodiments of the present disclosure, adjacent bamboo strips are connected through connecting lines, through holes are formed in the bamboo strips, the connecting lines pass through the through holes in a sequence, a thickness of the bamboo strips is 1.4 mm to 1.6 mm, and the interlayer is composed of 22 layers to 28 layers of the bamboo curtains.

In some embodiments of the present disclosure, steel screws are embedded between adjacent interlayers.

In the second aspect, a 45-foot and 53-foot container is provided by the embodiment of the present disclosure, comprising a container floor and a container body, wherein a plurality of Ω-shaped mounting parts are arranged on the container body, and the Ω-shaped mounting parts can extend into the U-shaped grooves of the container body.

In some embodiments of the present disclosure, a Ω-shaped mounting part is provided with an arc chamfer structure.

Compared with the prior art, the embodiments of the present disclosure have at least the following advantages or beneficial effects:

a 45-foot and 53-foot container floor is provided by the embodiment of the present disclosure, comprising: a floor body, the floor body comprises a first bamboo mat layer, an interlayer and a second bamboo mat layer, and the first bamboo mat layer, the interlayer and the second bamboo mat layer are sequentially pasted from a top to a bottom; a protection assembly is arranged on the floor body, the protection assembly comprises a protection shell and fastening screws, the protection shell is circumferentially wrapped on a side wall of the floor body, and the fastening screws are arranged running through the protection shell and the floor body. The above-mentioned floor body is used for carrying the goods contained in the container, and is made of laminated bamboo materials, and has high mechanical properties. The bamboo materials are energy-saving, environment-friendly and easy to regenerate. The first bamboo mat layer and the second bamboo mat layer are used to protect the interlayer, and provide a certain mechanical strength, so as to greatly improve the mechanical properties of the interlayers by laminated multiple layers. The interlayers are used to withstand the pressure of the main goods and greatly improve the mechanical properties of the interlayers. The protection assembly is used to protect the side of the floor body from damage and greatly improve the use performance of the floor body. The fastening screws are used for fixing the protection shell on the floor body and further bonding the multi-layer plate body.

Therefore, the 45-foot and 53-foot container floor can effectively protect the container floor and improve the service life of the container.

A 45-foot and 53-foot container is provided by the embodiment of the present disclosure, comprising a container floor and a container body, wherein a plurality of Ω-shaped mounting parts are arranged on the container body, and the Ω-shaped mounting parts can extend into the U-shaped grooves of the container body. The U-shaped grooves are uniformly arranged in the bottom of the container body to fix the container floor and avoid friction between the container floor and the side wall of the container body.

Therefore, the 45-foot and 53-foot container can facilitate the installation of the container floor and improve the installation efficiency of the container floor.

BRIEF DESCRIPTION OF DRAWINGS

In order to more clearly illustrate the technical solution of the embodiments of the present disclosure, the following will briefly introduce the drawings to be used in the embodiments. It should be understood that the following drawings only show some embodiments of the present disclosure, and therefore should not be regarded as a limitation of the scope. For ordinary technical personnel in this field, other relevant drawings can also be obtained according to these drawings without paying creative labor.

DETAILED DESCRIPTION OF THE EMBODIMENTS

Figure 1:
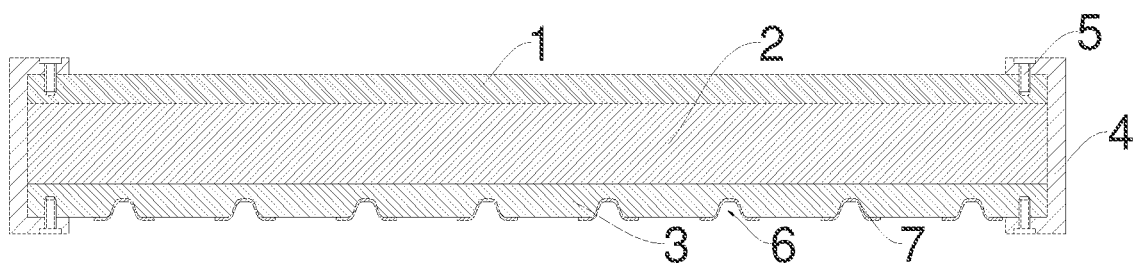
FIG. 1 shows a cross-sectional view in Embodiment 1 of the present disclosure.

In order to make the object, technical scheme and advantages of the embodiments of the present disclosure clearer, the technical scheme in the embodiments of the present disclosure will be described clearly and completely in combination with the drawings of the embodiments of the present disclosure. It is obvious that the described embodiments are part of the embodiments of the present disclosure, but not all of the embodiments. The components of embodiments of the present disclosure, generally described and shown in the drawings herein, may be arranged and designed in a variety of different configurations.

Therefore, the following detailed description of the embodiments of the disclosure provided in the drawings is not intended to limit the scope of the claimed disclosure, but merely represents selected embodiments of the disclosure. Based on the embodiments of the present disclosure, all other embodiments obtained by those of ordinary technical personnel in this field, without performing creative work are within the scope of the present disclosure.

It should be noted that similar numerals and letters denote similar terms in the following figures, so that once a term is defined in one drawing, it need not be further defined and explained in the following drawings.

In the description of the embodiments of the present disclosure, it needs to be explained that, if the directions or positional relationships indicated by the terms "center", "upper", "lower", "left", "right", "vertical", "horizontal", "inner", "outer" and the like appear are based on the directions or positional relationships shown in the drawings, or the directions or positional relationships that are usually placed when the present disclosure product is used, it is only for the convenience of describing the present disclosure and simplifying the description, and it is not to indicate or imply that the referred device or element must have a specific direction, structure and operation in a specific direction, so it can not be understood as the limitation of the present disclosure. Furthermore, the terms "first", "second", "third", etc., are used only to distinguish descriptions and can not be understood to indicate or imply relative importance.

In addition, the appearance of the terms "horizontal", "vertical", "overhang", etc. does not mean that the component is required to be absolutely horizontal or overhang, but may be slightly tilted. For example, "horizontal" only means that its direction is more horizontal than "vertical", which does not mean that the structure must be completely horizontal, but can be slightly tilted.

In the description of the embodiments of the present disclosure, "multiple" represents at least 2.

In the description of the embodiments of the present disclosure, it is also required to explain that, unless otherwise specified and limited, if the terms "setting", "installation", "joining" and "connection" appear, it shall be understood in a broad sense, for example, it can be a fixed connection, a detachable connection, or an integral connection; it can be a mechanical connection, or an electrical connection; it can be a direct connection, or an indirect connection through an intermediate medium, or a connection between two elements.

For an ordinary technical personnel in this field, the specific meaning of the above term in the present disclosure can be understood according to the specific situation.

Embodiment 1

Referring to FIG. 1, FIG. 1 shows a cross-sectional view in Embodiment 1 of the present disclosure.

a 45-foot and 53-foot container floor is provided by the embodiment of the present disclosure, comprising: a floor body, the floor body comprises a first bamboo mat layer 1, an interlayer 2 and a second bamboo mat layer 3, and the first bamboo mat layer 1, the interlayer 2 and the second bamboo mat layer 3 are sequentially pasted from a top to a bottom; a protection assembly is arranged on the floor body, the protection assembly comprises a protection shell 4 and fastening screws 5, the protection shell 4 is circumferentially wrapped on a side wall of the floor body, and the fastening screws 5 are arranged running through the protection shell 4 and the floor body. The above-mentioned floor body is used for carrying the goods contained in the container, and is made of laminated bamboo materials, and has high mechanical properties. The bamboo materials are energy-saving, environment-friendly and easy to regenerate. The first bamboo mat layer 1 and the second bamboo mat layer 3 are used to protect the interlayer 2, and provide a certain mechanical strength, so as to greatly improve the mechanical properties of the interlayers by laminated multiple layers. The interlayers 2 are used to withstand the pressure of the main goods and greatly improve the mechanical properties of the interlayers. The protection assembly is used to protect the side of the floor body from damage and greatly improve the use performance of the floor body. The fastening screws 5 are used for fixing the protection shell 4 on the floor body and further bonding the multi-layer plate body.

In some embodiment methods of the present embodiment, a plurality of U-shaped grooves are formed on a side of the floor body close to a container, firmwares 7 are correspondingly arranged on the plurality of the U-shaped grooves 6, a sealing layer is arranged between the firmwares 7 and the floor body, and the firmwares 7 are inserted into the interlayer 2 through the fastening rods. The U-shaped groove 6 is used for installing the container floor, making the fixing more stable, greatly improving the stability of the container floor; facilitating the positioning of the container floor, greatly improving the installation efficiency, reducing the installation time, and having lower technical requirements for installation. The U-shaped groove 6 is parallel to the length direction of the container floor, and the U-shaped groove 6 is a through-groove structure, and the through-groove structure is convenient for directly sliding the container floor into the container during installation, greatly improving the installation efficiency and saving time and labor. The firmware 7 is used to reinforce the U-shaped groove 6 so as to prevent the laminated bamboo material of the U-shaped groove 6 from being damaged due to the friction of the firmware 7 and then causing the fracture forming an opening. The fastening rod is used for installing the firmware 7 to the U-shaped groove 6 to prevent the firmware 7 from falling off, and then sealing between the U-shaped groove 6 and the firmware 7 by glue to prevent moisture from flowing in, greatly improving the service life of the container floor.

In the present embodiment, the fastening screw 5 is a screw, has a low price, wide range of use, and is easy to purchase.

In some embodiment methods of the present embodiment, the protection shell 4 is provided with a mounting groove 11. The protection shell 4 is a rectangular frame structure. The protection shell 4 is arranged on the side wall of the long side of the mounting groove 11, and the mounting groove 11 is parallel to the U-shaped groove 6, so as to further fix the container floor, avoid sliding friction which causes the abrasion of the firmware 7 and the protection shell 4 at the joint, and improve the use effect of the protection shell 4 and can also prolong the service life of the protection shell 4.

In some embodiment methods of the present embodiment, the floor body is coated with an isolation layer. The isolation layer is coated on the surface of the floor body to isolate water vapor from entering the inside of the floor body, so as to prevent the floor body from being affected with damp which will reduce the mechanical properties of the floor body.

In some embodiment methods of the present embodiment, a material of the isolation layer contains a phenolic resin adhesive with an insect repellent. The above-mentioned isolation layer material is used to prevent the moth from corroding the bamboo wood, and can effectively prevent the pest from damaging the container floor, and can further improve the service life of the container, with no need to replace frequently, and can improve the safety performance In the present embodiment, the phenolic resin has excellent properties such as good heat resistance, high bonding strength, tensile strength, impact resistance, moisture-heat aging resistance, etc. By providing the phenolic resin bonding connection, the compressive strength and corrosion resistance of the container floor are improved, and the service life of the container floor is prolonged.

In other embodiments, the above isolation layer can choose paint, and the paint has anti-corrosion, waterproof, oil-proof, chemical resistance, light resistance, temperature resistance and other properties. The object is exposed to the atmosphere and eroded by oxygen and water, resulting in metal corrosion, wood decay and cement weathering. The surface of the object is coated with a coating material to form a protective film, which can prevent or delay the occurrence and development of these damage phenomena and prolong the service life of various materials. The coating material also has decorative functions, such as color, gloss, pattern and flatness. The coating material of different objects can obtain colorful and beautiful appearance, and the appearance can beautify the living environment of human beings and make a significant contribution to the material and spiritual life of human beings. In addition, the paint is provided with marking, anti-fouling, insulation, etc. The paint material is not only waterproof and anti-corrosive, but also can provide various colors, and is the ideal material for the isolation layer, but is not limited to this material, and the coating material can be other similar materials.

Figure 2:
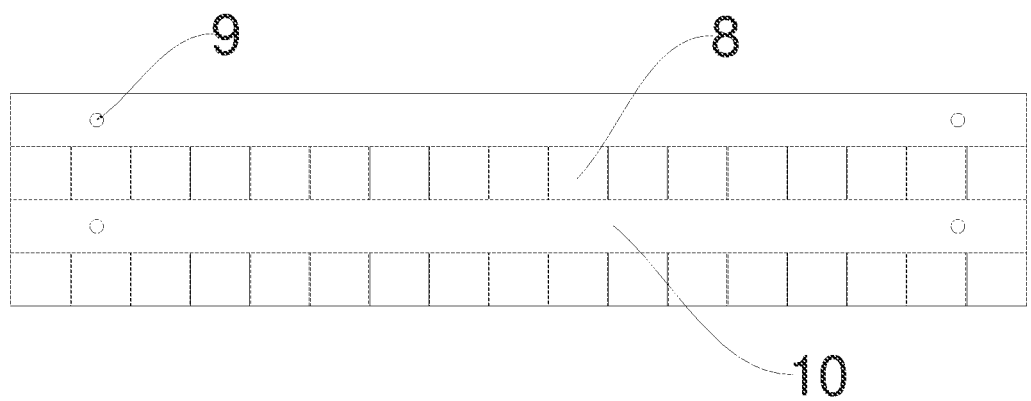
FIG. 2 shows an interlayer diagram in the Embodiment 1 of the present disclosure.
Figure 3:
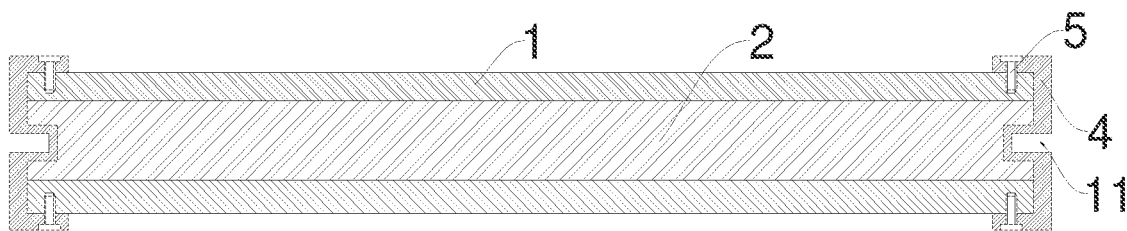
FIG. 3 shows a section view of a mounting groove in the Embodiment 1 of the present disclosure.

Referring to FIG. 2, FIG. 2 shows an interlayer 2 diagram in the Embodiment 1 of the present disclosure.

In some embodiment methods of the present embodiment, the interlayer 2 is laminated with multi-layer bamboo curtains 10, the bamboo curtains 10 are laminated with a plurality of bamboo strips 8, and the bamboo strips 8 of adjacent bamboo curtains 10 are arranged perpendicularly to an each other. The above-mentioned interlayer 2 is used to provide the main supporting function, increase the bearing load of the interlayer 2 by the arrangement of multiple layers, facilitate the application of more positions, and increase the usability of the interlayer 2. The bamboo curtain 10 layer is laminated with a plurality of bamboo strips 8, and the bamboo strips 8 of the adjacent bamboo curtain 10 are perpendicular to each other, so that the tensile strength of the bamboo curtain 10 in both the transverse direction and the longitudinal direction can be increased, therefore the mechanical strength of the entire floor body are improved.

In other embodiments, the bamboo strips 8 of the layers of the adjacent bamboo curtains 10 may have a tilted angle of 45°, so that the compression resistance of the bamboo curtains can be increased.

In the present embodiment, the interlayer 2, the first bamboo mat layer 1 and the second bamboo mat layer 3 are made of bamboo. Bamboo is a tall arboreal grass. More than 70 genera and more than 1000 species of the Bamboo are recorded, but many of them are synonyms. Bamboo is a tall, fast-growing grass plant, and the stem of bamboo is wood. Bamboo is distributed in the tropical, subtropical and warm temperate zones, with East Asia, South-East Asia and the Indian Ocean and Pacific islands being the most concentrated and distributed species. The aboveground stem of bamboo is woody and hollow (we call it bamboo stem), and it is formed in clusters from the underground stem (rhizome) of bamboo.

Compared with trees, bamboo has a short growth cycle, wide source, corrosion resistance, and can maintain good physical properties for a long time. In addition, bamboo has high hardness and strong toughness, so bamboo is more and more used in life. Bamboo strips are bamboo skins cut into certain specifications by cutting bamboo poles, and they are kind of thin strips of bamboo, and are suitable for weaving into bamboo products of various shapes.

Preferably, the bamboo strips 8 in the embodiment are cut by the bamboo pole of phyllostachys pubescens, and phyllostachys pubescens is the bamboo species with long cultivation, widest area and most important economic value in China. Phyllostachys pubescens is large and suitable for selection and cutting.

It should be noted that phyllostachys pubescens is only one of the preferred embodiments of the present embodiment, and the present disclosure is not limited to this, and in other embodiments, ma bamboo and arrow bamboo, etc., can also be used.

Referring to FIG. 2, FIG. 2 shows an interlayer diagram in the Embodiment 1 of the present disclosure.

In some embodiment methods of the present embodiment, adjacent bamboo strips 8 are connected through connecting lines, through holes 9 are formed in the bamboo strips 8, the connecting lines pass through the through holes 9 in a sequence, a thickness of the bamboo strips is 1.4 mm to 1.6 mm, and the interlayer 2 is composed of 22 layers to 28 layers of the bamboo curtains 10. The connecting line is used for tightening and fixing the bamboo strips 8, and then the bamboo strips 8 are formed into the bamboo curtain 10 of the interlayer 2 by dipping the bamboo strips 8 with glue, and then the bamboo curtain 10 of the multilayer is pressed into the interlayer 2 by a hot press to improve the strength of the interlayer. The through hole 9 is convenient for the connecting line to pass through the through hole 9 to improve the mechanical strength of the bamboo curtain 10. The thickness of the bamboo strip 8 can be 1.4 mm to 1.6 mm, and the interlayer 2 can be composed of 22 layers to 28 layers of the bamboo curtain 10. And the mechanical strength and load of the interlayer 2 can be increased by superposing the layers.

In the present embodiment, the single-layer bamboo curtain 10 is provided in the same direction so as to retain the excellent characteristics of high density, good toughness and high strength inherent in the bamboo material, so that the bamboo curtain 10 is more durable and not easily deformed, and the longitudinal compressive strength of the bamboo curtain 10 is improved.

In some embodiment methods of the present embodiment, steel screws are embedded between adjacent interlayers. The steel screws are used to improve the mechanical properties of the container floor and can greatly improve the service life of the container floor. The above-mentioned steel screws are located in the area surrounded by the protection shell 4 of the floor to avoid the edge of the floor breaking, and to improve the mechanical strength and service life of the floor.

Embodiment 2

Figure 4:
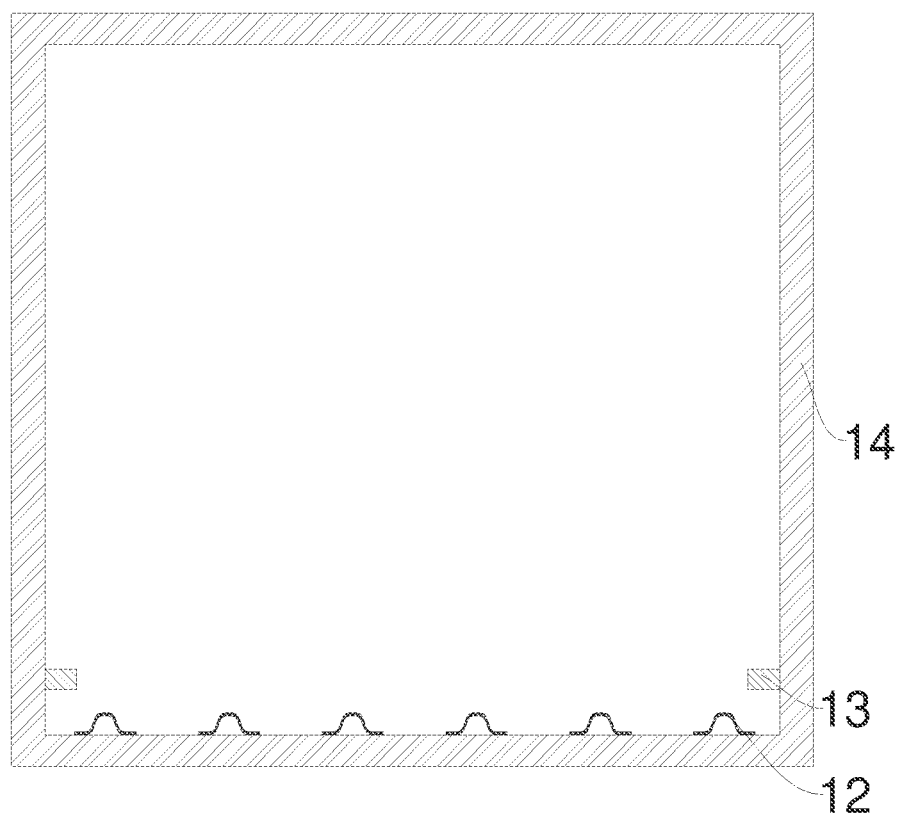
FIG. 4 shows a cross-sectional view in Embodiment 2 of the present disclosure.

Referring to FIG. 4, FIG. 4 shows a cross-sectional view in Embodiment 2 of the present disclosure.

A 45-foot and 53-foot container is provided by the embodiment of the present disclosure, comprising a container floor and a container body 14, wherein a plurality of Ω-shaped mounting parts 12 are arranged on the container body 14, and the Ω-shaped mounting parts 12 can extend into the U-shaped grooves 6 of the container body. The Ω-shaped mounting parts 12 match with the U-shaped grooves 6 and are uniformly arranged in the bottom of the container to fix the container floor and avoid friction between the container floor and the side wall of the container body, so as to greatly improve the stability of the container floor for daily use.

In some embodiment methods of the present embodiment, a Ω-shaped mounting part 12 is provided with an arc chamfer structure. The arc chamfer structure can increase the fit between the Ω-shaped mounting part 12 and the U-shaped groove 6, effectively reduce the friction between the firmware 7 on the U-shaped groove 6 and the Ω-shaped mounting part 12, and effectively increase the use cycle of the Ω-shaped mounting part 12.

In the present embodiment, a limit strip 13 is arranged on the inner side of the side wall of the container, and is parallel to the Ω-shaped mounting part 12, so as to facilitate the vertical positioning of the floor body and avoid vibration which causes the frequency of the floor body inconsistent with the frequency of the container, and the floor body and the container are integrally arranged through the limit strip 13, so as to avoid mutual movement.

In the present embodiment, the container is provided with a fixing hole, the fixing hole is a blind hole, the opening direction of the fixing hole is perpendicular to the floor body and a pin is arranged in the fixing hole to fix the floor body transversely.

In the present embodiment, the material of the Ω-shaped mounting part 12 and the fixing member can be an alloy added with a certain amount of other alloying elements based on aluminum, and is one of the light metal materials.

In addition to the general characteristics of aluminum, aluminum alloys have specific characteristics of some alloys due to the variety and quantity of alloying elements added. The density of aluminum alloy is 2.63 g/cm~2.85 g/cm. The aluminum alloy has high strength (tensile strength is 110 MPa~650 MPa). And the specific strength of the aluminum alloy is close to the specific strength of high alloy steel, and the specific rigidity of the aluminum alloy is more than the specific rigidity of steel. And the aluminum alloy has good casting performance and plastic processing performance, good conductivity and heat conduction performance, good corrosion resistance and weldability, and can be used as structural materials, and has wide application in aerospace, aviation, transportation, building, mechatronics, light chemical and daily necessities. The aluminum alloy has a light texture and good corrosion resistance, and is an ideal material for the Ω-shaped mounting part 12 and the fixing member. However, the aluminum alloy is not limited to the aluminum alloy material, but other materials having similar properties can be used.

In use, the door body of the container is opened, the U-shaped groove 6 and the mounting groove 11 of the container floor are aligned with the Ω-shaped mounting part 12 and the limit strip 13, and then the floor body is pushed into the container.

To sum up, a 45-foot and 53-foot container floor is provided by the embodiment of the present disclosure, comprising: a floor body, the floor body comprises a first bamboo mat layer 1, an interlayer 2 and a second bamboo mat layer 3, and the first bamboo mat layer 1, the interlayer 2 and the second bamboo mat layer 3 are sequentially pasted from a top to a bottom; a protection assembly is arranged on the floor body, the protection assembly comprises a protection shell 4 and fastening screws 5, the protection shell 4 is circumferentially wrapped on a side wall of the floor body, and the fastening screws 5 are arranged running through the protection shell 4 and the floor body. The above-mentioned floor body is used for carrying the goods contained in the container, and is made by laminated bamboo materials, and has high mechanical properties. The bamboo materials are energy-saving, environment-friendly and easy to regenerate. The first bamboo mat layer 1 and the second bamboo mat layer 3 are used to protect the interlayer 2, and provide a certain mechanical strength, so as to greatly improve the mechanical properties of the interlayers by laminated multiple layers. The interlayers 2 are used to withstand the pressure of the main cargo and greatly improve the mechanical properties of the interlayers. The protection assembly is used to protect the side of the floor body from damage and greatly improve the use performance of the floor body. The fastening screws 5 are used for fixing the protection shell 4 on the floor body and further bonding the multi-layer plate body. Therefore, the 45-foot and 53-foot container floor can effectively protect the container floor and improve the service life of the container.

A 45-foot and 53-foot container is provided by the embodiment of the present disclosure, comprising a container floor and a container body 14, wherein a plurality of Ω-shaped mounting parts 12 are arranged on the container body 14, and the Ω-shaped mounting parts 12 can extend into the U-shaped grooves 6 of the container body. The Ω-shaped mounting parts 12 match with the U-shaped grooves 6 and are uniformly arranged in the bottom of the container to fix the container floor and avoid friction between the container floor and the side wall of the container body. Therefore, the 45-foot and 53-foot container can facilitate the installation of the container floor and improve the installation efficiency of the container floor.

The above embodiment is only a preferred embodiment of the present disclosure and is not intended to limit the present disclosure, and can be variously changed and modified for those skilled in the art. Any modification, equivalent replacement, improvement, etc. made within the spirit and principles of the disclosure shall be covered by the protection of the disclosure.

What is claimed is:

1. A container floor, comprising: a floor body, the floor body comprises a first bamboo mat layer, an interlayer and a second bamboo mat layer, and the first bamboo mat layer, the interlayer and the second bamboo mat layer are sequentially pasted from a top to a bottom; and a protection assembly is arranged on the floor body, the protection assembly comprises a protection shell and fastening screws, the protection shell is circumferentially wrapped on a side wall of the floor body, and the fastening screws are arranged running through the protection shell and the floor body;

wherein the interlayer is laminated with multi-layer bamboo curtains, the bamboo curtains are laminated with a plurality of bamboo strips, and the bamboo strips of adjacent bamboo curtains are arranged perpendicularly to an each other, and wherein adjacent bamboo strips are connected through connecting lines, through holes are formed in the bamboo strips, the connecting lines pass through the through holes in a sequence, a thickness of the bamboo strips is 1.4 mm to 1.6 mm, and the interlayer is composed of 22 layers to 28 layers of the bamboo curtains.

2. The container floor according to claim 1, wherein:

a plurality of U-shaped grooves are formed on a side of the floor body close to a container, firmwares are correspondingly arranged on the plurality of the U-shaped grooves, a sealing layer is arranged between the firmwares and the floor body.

3. The container floor according to claim 1, wherein: the floor body is coated with an isolation layer.

4. The container floor according to claim 3, wherein: a material of the isolation layer contains a phenolic resin adhesive with an insect repellent.

5. The container floor according to claim 1, wherein: steel screws are embedded between adjacent interlayers.

6. A container according to claim 2 comprises the container floor and a container body, wherein a plurality of Ω-shaped mounting parts are arranged on the container body, and the Ω-shaped mounting parts can extend into the U-shaped grooves of the container floor.

7. The container according to claim 6, wherein: the Ω-shaped mounting parts are provided with arc chamfer structures.

* * * * *